United States Patent [19]

Halabiya

[11] Patent Number: 4,963,692
[45] Date of Patent: Oct. 16, 1990

[54] BRAKE CONTROL VALVE

[75] Inventor: Sabah Halabiya, Rheinhausen, Fed. Rep. of Germany

[73] Assignee: Deere & Company, Moline, Ill.

[21] Appl. No.: 424,783

[22] Filed: Oct. 19, 1989

[30] Foreign Application Priority Data

Nov. 5, 1988 [EP] European Pat. Off. ............ 3837650

[51] Int. Cl.⁵ .......................... B60T 11/08; F15B 7/04
[52] U.S. Cl. ........................................ 60/578; 60/581; 60/588
[58] Field of Search ................... 60/574, 578, 588, 581

[56] References Cited

U.S. PATENT DOCUMENTS 4,072,012 2/1978 Kawakami ...................... 60/588 X
4,483,145 11/1984 Takeuchi et al. .

FOREIGN PATENT DOCUMENTS 894145 7/1949 Fed. Rep. of Germany .
3151403 7/1983 Fed. Rep. of Germany .
1216245 12/1970 United Kingdom .
2129889 5/1984 United Kingdom .

Primary Examiner—Allen M. Ostrager

[57] ABSTRACT

A brake control valve has a valve bore, a piston member and an end member closing one end of the valve bore. One of the piston and end members has a projection and the other member has a corresponding blind bore for sealingly receiving the projection. The blind bore and the projection are spaced apart axially in the rest position of the piston. Upon axial movement of the piston the projection is sealingly received by the blind bore so that the effective working area of piston is reduced. By means of appropriate channels and grooves the chamber surrounding the projection is connected to reservoir.

11 Claims, 3 Drawing Sheets

BRAKE CONTROL VALVE

BACKGROUND

The invention relates to a brake control valve.

There are known valves which, when actuated, initially bring operating devices to a ready position (filling stage), and which, upon further actuation, deliver the essential operating pressure to the operating devices (pressure stage). In a hydraulic brake arrangement the brake cylinder must initially be filled with hydraulic fluid until the brake cylinder makes contact with the brake disk. Only then does further pressure build-up produce the actual braking action. Accordingly, the design of a hydraulic brake system must be proportioned in such a way that the fluid volume displaced by the brake control valve cylinder (master cylinder) is sufficient to fill the brake cylinder (slave cylinder) and to force the piston of the brake cylinder into contact with the brake disk. In addition, the fluid pressure generated by the brake control valve must be sufficient to obtain the required braking action.

The fluid volume displaced may be increased by increasing the diameter and the stroke of the piston of the brake control valve, while an increase in fluid pressure requires an increase in the force applied to the brake control valve piston. However, there are limits to the design of the stroke and the applied braking force. Which stroke and which braking force can be achieved will depend upon the particular conditions. In a vehicle brake, the stroke will depend upon the maximum travel of the brake lever, which is prescribed by the optimum pedal travel. A foot-operated brake is limited by the force of the foot upon the brake pedal which must be sufficient for the desired braking force. The force on the pedal may not exceed the limit established by law.

An increased fluid pressure and therewith an increased braking action can be realized by a reduction in the diameter of the brake control valve piston, within the limits of the prescribed pedal force. However this would require an increase in the stroke of the brake control valve piston, in order to provide the required fluid volume to fill the brake cylinder. The stroke, however, is limited by the optimum pedal travel.

In the design of a brake system the pedal force, the brake lever ratio, pedal travel, brake control valve cylinder and brake cylinder must be balanced among each other. By increasing the diameter of the brake control valve cylinder the pedal travel could be reduced, assuming the pedal force remains constant, which also will reduce the resulting braking force. Corresponding problems can be encountered in the design of valves for other applications.

SUMMARY

An object of the present invention is to provide a valve which can supply a large fluid volume and a high operating pressure to a brake cylinder with a relatively short stroke of the brake control valve piston.

This object is achieved by this invention by providing in the area of the end face of the piston and in the opposing valve housing part at least one piston-shaped projection and at least one corresponding recess. In the rest position the piston, that is, as long as no pressure is being delivered to the brake cylinder, the projection and recess are spaced apart from each other. If the piston is moved axially, in order to provide pressure to the operating device, the projection slides into the recess. Thereupon the chamber within the recess is sealed from the remaining chamber ahead of the end face of the piston. By this means the pressure chamber ahead of the end face of the piston is subdivided into at least two partial chambers (the number of partial chambers depends on the number of projections and the corresponding recesses). In principle, each of the partial chambers can be utilized to supply pressure to a brake cylinder. Each of the partial chambers is associated with an effective piston cross section. In the initial stage of piston movement the entire piston cross section is utilized for pressure generation. The effective cross section is reduced upon reaching the pressure stage. The force on the piston can now be concentrated on this reduced cross section, leading to an increase in pressure in this area.

The valve according to this invention is of simple construction and can be manufactured at favorable cost. With a relatively short stroke of the valve piston it is able to deliver a relatively large fluid fill volume and a relatively high operating pressure.

Preferably, the projection and the recess are cylindrical in shape and are aligned axially with respect to the valve bore. Sealing of the recess from the remaining pressure chamber is provided by an O-ring, which is in sealing contact with both surfaces as the projection enters the recess.

The axial distance between the projection and the recess is preferably proportioned so that the hydraulic fluid volume corresponding to this distance is approximately sufficient to bring the brake cylinder from its position of rest to its ready position. Thereby the valve is able, in its initial stage (fill stage) to deliver a fluid volume to the operating device, by virtue of its large effective piston cross section, and to provide its initial filling. Fluid pressure may remain relatively low during this stage and is required to overcome only the return forces of the brake cylinder, so that the brake cylinder is brought into contact with the brake disk. Here the fluid pressure need only be sufficient to overcome the sealing friction and the force of the return spring of the brake cylinder. At the completion of this first stage the brake piston is in contact with the brake disk. In a second stage, the so-called pressure stage, the fluid pressure needed for the braking action itself is generated by a smaller piston diameter.

According to the preferred embodiment of the invention only one cylindrical projection and one cylindrical recess are provided. Two alternative preferred embodiments exist for the projection and recess. Either the projection is attached to the surface opposite the end face of the piston and the recess is located in the moveable piston of the valve (FIGS. 1, 2 and 4) or, the projection is attached to the moveable piston, while the recess is located in the opposing part (FIGS. 3 and 5).

As to the question which of the partial pressure chambers should be utilized to provide pressure to the operating device during the pressure stage, at least two solutions are possible. For example, the chamber surrounding the projection could be used for this purpose (FIGS. 4 and 5). However, a particularly simple design results when the chamber formed by the recess is connected hydraulically to the operating device (FIGS. 1,2 and 3.). This connection, for example, may be a channel oriented concentric to the bore of the valve cylinder in the part opposite the piston.

One embodiment of the invention provides for valve means for the connection between the pressure chamber and a reservoir for the hydraulic fluid. This connection should exist when the piston is in its position of rest so that pressure can be released in this position. When the piston is moved from its position of rest, the connection is interrupted. The closure can be accomplished by movement of the outer surface of the piston across an opening in the cylinder wall of a connecting channel.

The optimum effectiveness of the valve of this invention is obtained when the pressure in the partial chamber, which is not connected to the operating device, is released during the pressure stage. For this purpose the preferred embodiment provides valve means which can form a connection between the aforementioned partial chamber and a reservoir. The preferred valve means would be a channel in the cylinder housing which connects a reservoir with the cylinder bore. This channel cooperates with a circular groove in the outer surface of the piston, which in turn, is connected by a further channel with the aforementioned partial chamber. By movement of the piston a connection can be established between the reservoir and the partial chamber whose pressure is to be released through the aforementioned channels and the circular groove.

According to a further embodiment of the invention, the aforementioned partial chamber, which is not used to generate pressure during the pressure stage, is connected by a pressure relief valve to a reservoir. The appropriate configuration of the pressure control valve is an over pressure relief valve, which is arranged so as to open when the pressure is greater than that required to overcome the sealing friction and the force of the return spring in the operating device. This pressure relief valve serves primarily to avoid an excessive pressure build-up in the first stage (fill stage), to assure an engagement of the projection with the recess.

The arrangement of the relief valve is particularly advantageous when, in addition to its function of over pressure control, it provides pressure relief when the piston is in its position of rest as well as pressure relief for the aforementioned enclosed partial chamber during the pressure This configuration affords a relatively short overall length of the valve.

With the aid of the drawings, which show several embodiments of the invention, the invention, its advantages as well as further advantageous developments will be cited and described in greater detail.

DETAILED DESCRIPTION

Figure 1:
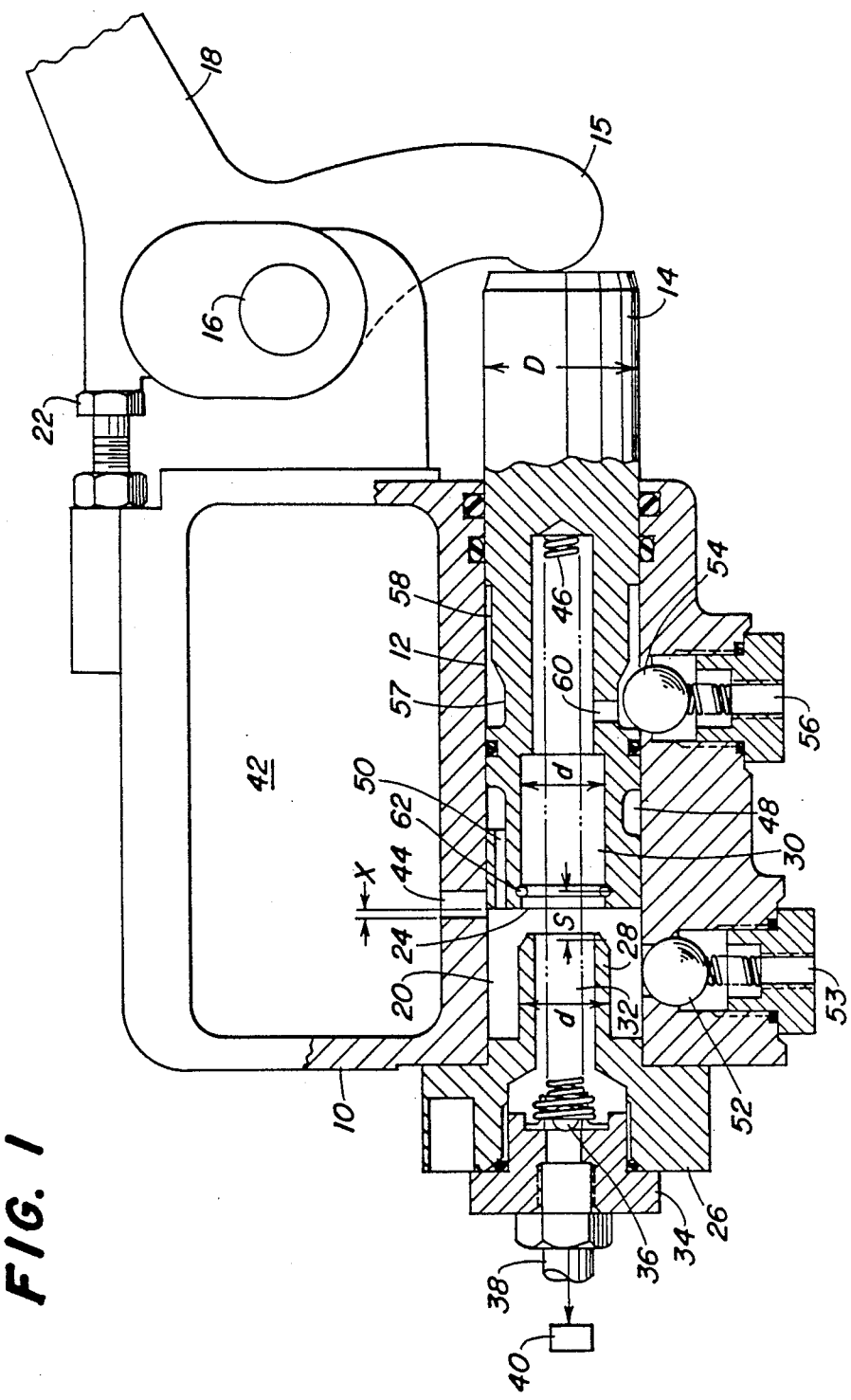
FIGS. 1 and 2 each show cross sections of a valve according to the invention.

FIG. 1 shows a brake control valve with a valve housing 10 with a valve bore 12 which accommodates an axially moveable piston 14. One end of the piston 14 projects from the bore 12. This end engages the free leg 15 of a brake lever 18 that pivots about pin 16. Upon actuation of the brake lever 18 the free leg 15 forces the piston 14 further into the bore 12 resulting in braking pressure being generated in the pressure chamber 20. The return of the brake lever 18 is limited by a stop which can be adjusted by the adjusting screw 22.

Opposite the piston end face 24 a flanged part 26 closes and seals the bore 12. The flanged part 26 carries a cylindrical projection 28 which projects axially inwardly and which is opposed by a blind bore 30 in the piston 14. The flanged part 26 includes an axial hole 32. This hole 32 is closed by a valve insert 34. The valve insert 34 accommodates a check valve 36, which is a spring-loaded ball valve. The valve insert 34 is connected by a hydraulic line 38 to a brake cylinder 40, not detailed further. The check valve 36 has the function of preventing a rapid return of the fluid from the brake cylinder 40 into the pressure chamber 20 of the brake control valve.

A reservoir 42 is integrated into the brake control valve housing 10. This is connected by a hole 44 to the bore 12. Movement of the piston 14 permits closing of the hole 44 by the outer cylindrical surface of the piston 14. The piston 14 is forced by a compression spring 46, seated on the valve insert 34 and in the blind bore 30 of the piston 14, against the free leg 15 of the brake lever 18. The stop can be adjusted by the screw 22 in such a way that a connection between the fluid reservoir 42 and the pressure chamber 20 is assured in the position of rest. The opening dimension is designated with "X".

A circular groove 48 is located at a distance from the end face 24 on the outer cylindrical surface of the piston 14, and is connected by a channel 50 with the pressure chamber 20, located ahead of the end face 24 of the piston 14.

A relief valve 52 is integrated into the housing 10 in the area of the pressure chamber 20, whose outlet opening 53 is connected hydraulically with the fluid reservoir 42 by a connecting line, not shown. The relief valve consists generally of a spring-loaded ball valve. The spring load is so designed that the ball will lift off the valve seat upon exceeding a preset pressure in the pressure chamber 20 and permit fluid flow.

In addition, the brake control valve cylinder housing 10 is provided with a pressure equalizing valve 54 which is located between the bore 12 and a corresponding equalizing valve in a second brake control valve (not shown). The connecting line which attaches to the fitting. 56 is not shown. The pressure equalizing valve consists generally of a ball which is forced against a valve seat by a spring. The ball extends partially into the bore 12, which is made possible by a ring-shaped recess 57 in the outer piston surface. Adjacent to the recess 57 is a cylindrical part 58 of the piston 14, whose outside diameter is less than the bore 12. The ring-shaped recess 57 is connected by a channel 60 with the recess 30 of the piston 14.

Mode of Operation

The brake control valve is shown in its position of rest, that is, the brake lever 18 is not loaded by a braking force. Due to the force of the compression spring 46, the piston is in its extreme right position and opens one part of the channel 44 between reservoir 42 and pressure chamber 20 Fluid pressure is released in the pressure chamber 20, the line 38 leading to the brake cylinder and the brake cylinder 40. There is no braking action. The pressure relief valve 52 and the pressure equalizing valve 54 are closed.

Upon actuation of the brake lever 18 the piston 14 is moved towards the left. This will close the channel 44 between the reservoir 42 and the pressure chamber 20, so that the fluid in the pressure chamber 20 can no longer escape to the reservoir 42. Upon further movement of the piston 14 to the left, the pressure in the pressure chamber 20 will increase and force the fluid through the line 38 into the brake cylinder 40. Filling of the brake cylinder 40 moves the brake piston into contact with the brake disk, while overcoming sealing friction and the force of the return spring. Simultaneously with the movement of the piston 14 to the left, the ball of the equalizing valve 54 is forced against the spring of the equalizing valve 54 by the cylindrical surface 58 of the piston 14, so that a connection can be established with an additional brake control valve through a connecting pipe, not shown. In this way pressure is equalized in a system that consists of two brake pedals and two brake control valves, when both brake pedals are actuated.

The fluid enclosed in the pressure chamber 20 is forced, initially with relatively low pressure, into the brake cylinder 40 until the brake cylinder is filled with fluid and the brake piston is in contact with the brake disk (fill stage). The fluid pressure required for this purpose must be sufficient to overcome the sealing friction and the force of the return spring of the brake piston, which must be considered in the design of the cylinder diameter "D". Additional actuation of the brake lever 18 will raise the pressure in the system until the relief valve 52 opens. The opening pressure is set so that it is somewhat higher than the pressure required to overcome sealing friction and the force of the return spring of the brake piston. The relief valve 52 makes it possible to move the piston 14 further to the left with approximately the same force (as shown in FIG. 1), even though the brake cylinder is filled with fluid.

Under continuing braking force, the piston moves further to the left so that the projection 28 engages the recess 30. After moving through the path "S" the recess 30 is sealed off from the pressure chamber 20 by the sealing O-ring 62. Almost simultaneously a connection is created between the reservoir 42 and the pressure chamber 20 by means of the channel 44, the circular groove 48 and the longitudinal channel 50, so that pressure in the pressure chamber 20 is released. The relief valve 52 closes again. Now the second stage of the braking sequence begins, which is here designated the pressure stage. The force applied by the brake lever 18 to the piston 14 is now concentrated upon the diameter "d" of the projection 28 or the recess 30. With constant brake lever force the pressure in the brake system is increased considerably, so that the required braking force can be applied.

Figure 2:
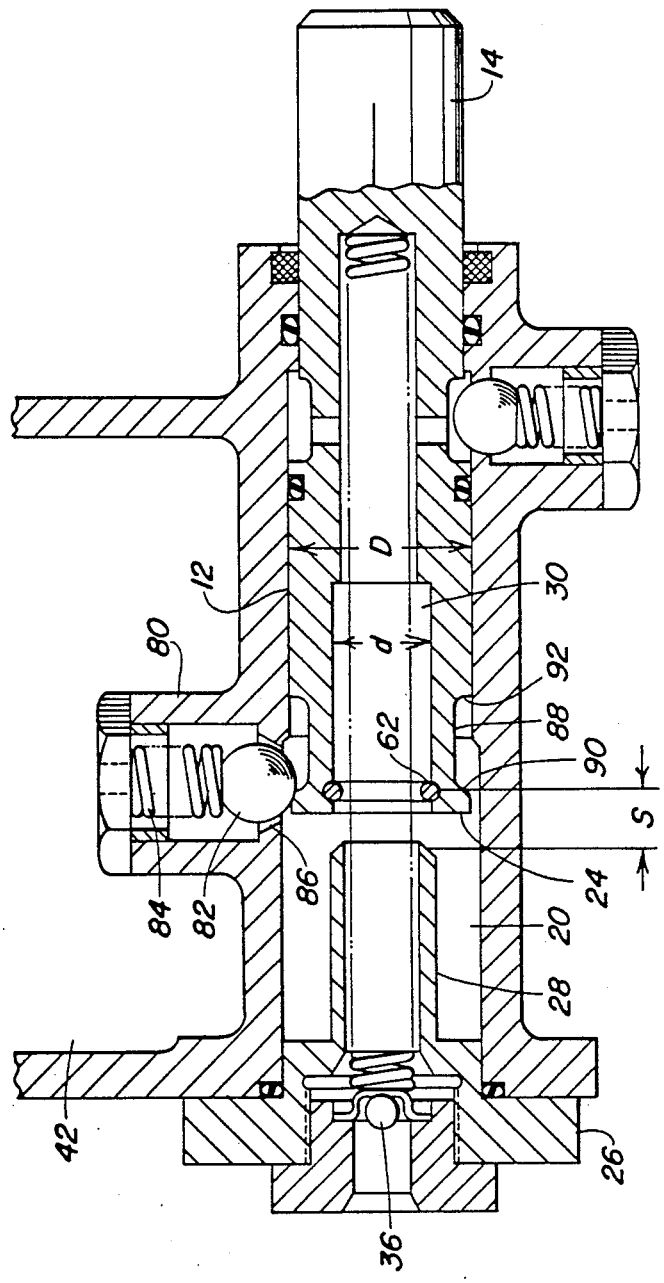

When the force on the brake lever is released, the piston 14 again moves to the right and occupies its initial position. An additional brake control valve is illustrated in FIG. 2, whose arrangement differs from that shown in FIG. 1 only in the arrangement and configuration of the pressure relief valve. Accordingly corresponding component parts retain same reference numbers.

The relief valve 80 is located immediately between the reservoir 42 and the cylinder bore 12. A ball 82 is forced by a spring 84 against a valve seat surface 86. The piston 14 is provided with a groove 88 in its periphery, spaced axially from its end face 24, which is connected hydraulically with the pressure chamber 20, due to an enlargement of the diameter of the cylinder bore. At an intermediate position of the piston 14, the ball 82 of the relief valve 80 engages this groove to such an extent that the relief valve 80 is closed. The location of the groove 88 is selected in such a way that in the rest position of the piston 14, the left side 90 of the groove 88 lifts the ball 82 off the valve seat surface 86, so that a connection is created between the reservoir 42 and the pressure chamber 20. Upon actuation of the brake lever 18 the piston 14 moves to the left, so that the ball 82 can penetrate more deeply into the groove 88 and close the relief valve 80. As soon as the projection 28 engages the recess 30 and sealing by the O-ring 62 occurs, the ball 82 is lifted by the right side 92 of the groove 88 so that again a connection is made between the reservoir 42 and the pressure chamber 20. The spring force of the relief valve 80 is selected in such a way that the relief valve 80 opens only when the pressure in the pressure chamber 20 exceeds the pressure that is required to overcome the sealing friction and the force of the return spring in the brake cylinder. The operation of the brake control valve shown in FIG. 2 is analogous to that described for the operation for FIG. 1.

Figure 3:
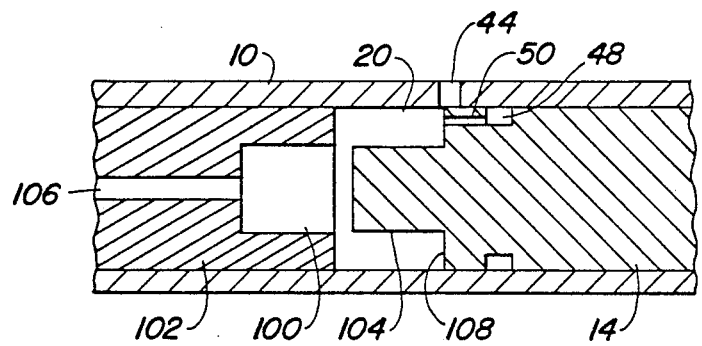
FIGS. 3, 4 and 5 each show a schematic diagram of alternative arrangements of the projection and recess of the valve according to the invention.
Figure 5:
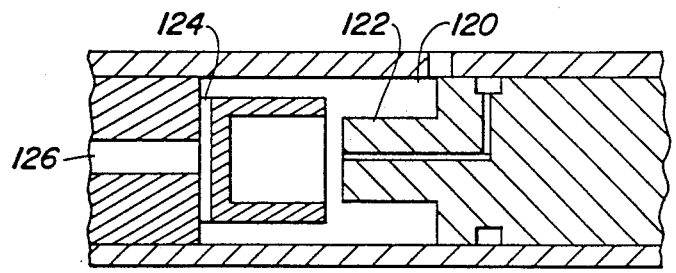
Figure 4:
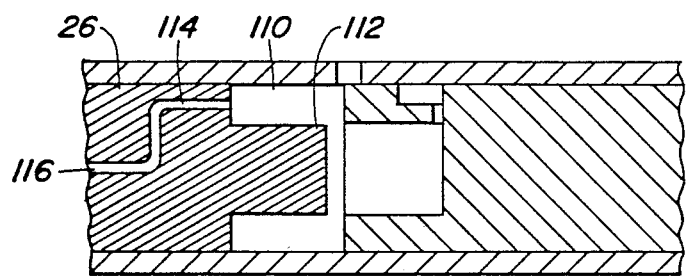

FIGS. 3, 4 and 5 show schematic sections of alternate embodiments of a brake control valve. In FIG. 3 the recess 100 is located in the flanged closure 102 of the brake control valve cylinder housing 10. The projection 104 that engages this recess is attached to the piston 14. Here too, pressure relief for the pressure chamber 20 is provided by a channel 44, a circular groove 48 and an axial channel 50.

The brake control valves shown in FIGS. 4 and 5 are distinguished from those shown in FIGS. 1 or 3 in particular only with respect to which partial chamber of the pressure chamber 20 is connected to the brake cylinder. While in FIGS. 1 and 3 the recess 30 or 100 is connected to the brake cylinder by a line 38 or 106, in the brake control valves shown in FIGS. 4 and 5 an external toroidal chamber 110, 120 surrounding the projection 112, 122 is connected hydraulically with the brake cylinder by means of the corresponding channels 114, 124 and a line 116, 126.

In the brake control valve indicated in FIG. 4 the projection 112 is located on the flanged closure 26 of the brake control valve cylinder housing 10, corresponding to the brake control valve shown in FIG. 1. In this respect the brake control valve shown in FIG. 5 is comparable to that shown in FIG. 3.

What is claimed:

1. A brake control valve having a housing having a bore therein, an end member closing one end of the bore, a piston member of diameter D axially movable in the bore, a wall of the bore, the end member and an end face of the piston member defining a pressure chamber, and a line for connecting the pressure chamber to a brake device, and an actuator for moving the piston, characterized by:

one of the piston and end members having a blind bore of diameter d less than diameter D projecting axially therein;

means for communicating the blind bore to the brake device;

and the other of the piston and end members having a projection projecting axially towards the blind bore, the projection and the blind bore being axially spaced apart during a rest position of the piston member so that fluid exposed to a larger working area of diameter D is forced from the pressure chamber to the brake device upon initial movement of the piston, further movement of the piston causing the blind bore to sealingly receive the projection so that fluid exposed only to a smaller working area of the piston is forced from the pressure chamber to the brake device.

2. The valve of claim 1, wherein the projection and the blind bore are cylindrical in shape.

3. The valve of claim 1 wherein the axial distance between the projection and the blind bore is dimensioned in such a way that a volume of hydraulic fluid corresponding to such distance is approximately sufficient to bring the operating device from its position of rest to its ready position.

4. The valve of claim 1, wherein the projection projects axially from an end face of the piston and the blind bore projects axially into the end member.

5. The valve of claim 1 further comprising;
means for connecting the blind bore to the brake device when an end of the blind bore is closed by the projection.

6. The valve of claim 1, further comprising:
a reservoir; and
valve means for communicating the pressure chamber to the reservoir when the piston member is in its rest position.

7. The valve of claim 6, wherein:
a radial passage in the housing connects the pressure chamber to the reservoir; and
movement of the piston member closes communication between the pressure chamber and the passage.

8. The valve of claim 1, further comprising:
valve means for communicating the valve bore to the reservoir when the blind bore is receiving the projection.

9. The valve of claim 8, wherein:
a radial passage in the housing connects the pressure chamber to the reservoir;
movement of the piston member closes communication between the pressure chamber and the passage; and
the piston member has a circular groove on an outer surface thereof spaced axially from an end face of the piston and a channel connects the groove to the end face of the piston, the groove being connected to the reservoir by the passage when the projection is sealingly received by the blind bore.

10. The valve of claim 1, further comprising:
a pressure relief valve for connecting the valve bore to a reservoir.

11. The valve of claim 10 wherein:
the pressure relief valve comprises a radial port in the valve housing which communicates with the valve bore, and the port forming a valve seat therein, a spring-loaded ball received in the port and extending partially into the valve bore when the ball engages the seat; and
the piston having a groove separated from an end face thereof by an annular land, the groove being connected with the pressure chamber and partially receiving the ball when the pressure relief valve is closed, the land lifting the ball off its seat when the piston is in its rest position, and an outer surface of the piston lifting the ball off of its seat when the piston is in a position in which the projection is sealingly received in the blind bore.

* * * * *